G. F. DENNE.
WATER COOLER.
APPLICATION FILED MAY 16, 1921.

1,428,945.  Patented Sept. 12, 1922.

Inventor:
George F. Denne
By Benjamin, Roodhouse Lundy
Attys.

Patented Sept. 12, 1922.

1,428,945

UNITED STATES PATENT OFFICE.

GEORGE F. DENNE, OF CHICAGO, ILLINOIS.

WATER COOLER.

Application filed May 16, 1921. Serial No. 469,814.

*To all whom it may concern:*

Be it known that I, GEORGE F. DENNE, a citizen of the United States, residing at Chicago, in the county of Cook and State of Illinois, have invented a new and useful Improvement in a Water Cooler, of which the following is a specification.

My present invention has relation to improvements in water coolers, and has special reference to water coolers for holding and supplying drinking water in public places, such as office buildings, railroad stations, railroad passenger cars, and the like.

Water coolers for supplying drinking water should have the cooled or drinking water compartment separated from the ice compartment so that any foreign matter adhering to the ice will not thereby be carried into the cooled drinking water, and the cooled drinking water compartment should be completely drained as frequently as possible to rid it of sediment, always present to some extent, which gravitates to the bottom after a fresh charge of water has been added. If the drinking water compartment is not thoroughly drained frequently an accumulation of sediment results which multiplies the possibility of contamination. The class of labor available for filling water coolers with ice and drinking water is not of a high intellectual order, and even with reasonably careful supervision it is impossible to rely upon a rule or regulation that prescribes the draining of the drinking water from the cooler when it is re-charged with ice.

It has been the objects of my present invention, first, to provide a water cooler having separate compartments for the water and the ice; second, to separate the openings for charging the respective compartments so that there will be no danger of contaminating the drinking water or the drinking water compartment with drippings from the ice while charging the ice compartment with ice; and, third, the arrangement of the two compartments so that it will be impossible, or at least much more difficult to refrain from completely draining the water compartment when charging the ice compartment than it would be to refill it when completely drained.

I prefer to accomplish the above mentioned objects by means of the structure illustrated in the accompanying drawing, in which—

Similar reference characters refer to similar parts throughout the several views.

Figure 1:
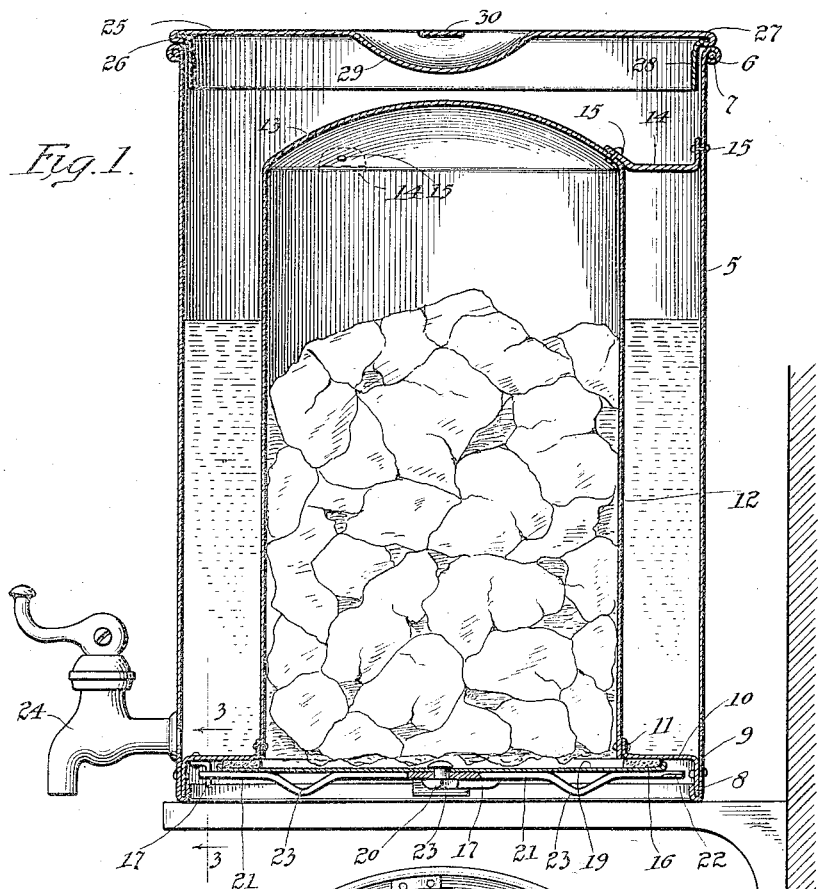
Figure 1 is a central vertical section through a water cooler embodying my invention.
Figure 2:
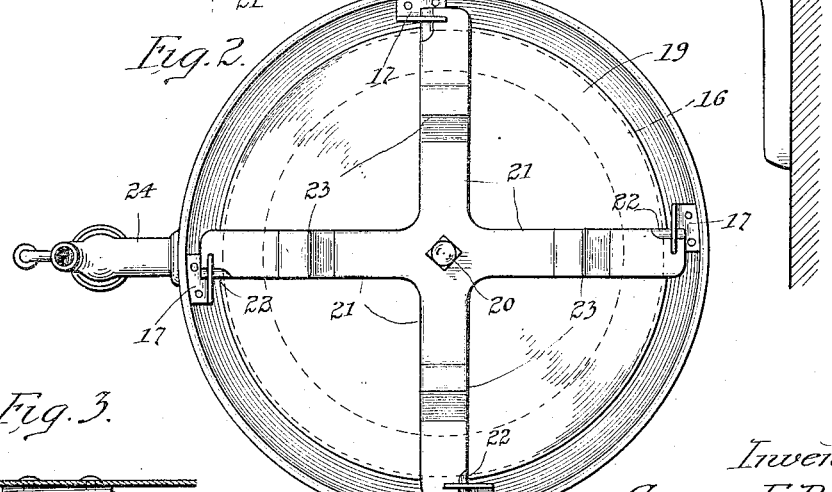
Figure 2 is a bottom plan of the structure shown in Figure 1.
Figure 3:
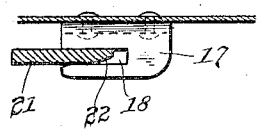
Figure 3 is a fragmental detail, partially in section, showing the manner of engagement of one of the latching arms for the closure for the charging opening in the ice compartment.

The invention consists, generally, of concentrically arranged compartments having their respective charging openings in diametrically opposite ends whereby the water compartment will completely drain, and cannot possibly receive any drippings from the ice when the ice compartment is brought into a position to receive a charge of ice.

The cooler is formed as follows: The outer side wall is a cylindrical sheet of metal 5 the upper edge of which is preferably rolled over a reinforcing wire 6 in the usual manner to provide a finishing bead 7. The lower edge of the outer wall is bent or seamed inwardly and upwardly to provide a channel 8 into which extends a right angled or lateral flange 9 of an annular or ring shaped member 10, the inner edge or periphery of which is laterally flanged, at 11, in a direction opposite to the flange 9. For greater security flange 9 may be riveted to wall 5, and it is also deemed best to solder, sweat or braze it within channel 8.

To the inner face of flange 11 is soldered, sweated or brazed the edge of another cylindrical sheet of metal 12, which extends upwardly into the compartment formed by wall 5 to adjacent the top thereof. The inner end of the inner cylinder 12 is closed with a preferably domed top 13 between which and outer wall 5 extend, preferably three, equally spaced straps 14, which are secured to the domed top 13 and outer wall 5 in any suitable manner, such as by rivets 15, and which straps serve to maintain the inner end of cylinder 12 in desired spaced relation with outer wall 5.

About the inner edge of the ring shaped member 10 is mounted a gasket 16 and outside of this gasket are a number, preferably four, right angled brackets 17 the upper horizontal flanges of which are riveted or otherwise secured to the ring shaped member 10, and the lower depending flanges of which are slotted, at 18, to receive the edges of the latching arms.

The closure for the lower end of the inner cylinder 12 is a disk shaped plate 19 of proper dimensions so that it will extend over gasket 16. To the center of the disk 19 is rotatably secured, by the headed rivet 20, or in any other suitable manner, the latch piece having radially extending arms 21 the edges of which are preferably beveled, at 22, for entry into slots 18 of brackets 17. One or more of the radial arms are slightly bowed intermediate their ends, as at 23, to facilitate the rotation of the latch piece, both to effect its engagement with and disengagement from slots 18.

It will be perceived from an inspection of Fig. 1 that the normal position of the cooler, when charged and ready for service, is resting upon the lower edge of wall 5. I have, therefore, provided in wall 5, just above its juncture, with the annular or ring shaped member 10, a tap or bib or spigot 24 for drawing off the cooled drinking water for use. The closure for the ice compartment need not constitute an absolute seal against the passage of water. Water coolers unavoidably sweat or accumulate condensation by reason of their low temperature, and some provision must be made in the stand upon which they are placed for carrying off this water of condensation which drips therefrom. The water resulting from the melting of the ice will find its escape in the same manner as the water of condensation.

The closure for the water compartment of my cooler consists of a disk 25 which extends to register with and rest upon bead 7 at the top of wall 5. The edge or periphery of disk 25 is turned or seamed downwardly and inwardly, at 26, to receive the laterally and outwardly flanged edge 27 of a depending flange 28 which enters the upper end of cylindrical wall 5. The center of disk 25 is depressed, as at 29, and a strap 30 is secured across the depression to provide a handle for greater convenience in removing or replacing the top. It is important that while this closure for the water compartment should fit sufficiently close to keep out dust, it should not be capable of a secure fit so that it will stay in place to retain the water when the cooler is reversed for receiving ice. For, if the attendant can secure the water closure in position so as to hold water, he will invariably do so to save himself the slight additional labor of refilling the water compartment with fresh water.

What I claim new is:—

1. A water cooler comprising a shell open at its top and providing a water chamber, an apertured bottom wall therefor, an ice container shell closed at its top and mounted at its open end upon said bottom wall around the aperture therein, a discharge cock communicating with the water chamber, a secured closure for the lower open end of said ice container, and a loose cover closing the top of the water chamber and adapted to be gravitated therefrom when the structure is inverted to release the secured closure.

2. A water cooler comprising a shell open at its top and providing a water chamber, an apertured bottom wall therefor, an ice-container shell closed at its top and mounted at its open end upon said bottom wall around the aperture therein, a discharge cock communicating with the water chamber, a secured closure for the lower open end of said ice-container, and a loose cover closing the top of the water chamber and adapted to be gravitated therefrom when the structure is inverted to release the second closure.

3. A water cooler comprising an outer cylindrical wall open at its top, an apertured bottom wall secured to and extending inwardly from the lower edge of said cylinder wall, a cylindrical ice container closed at its top and positioned with its lower edge around the aperture in said bottom wall, the lower open edge of said ice container and the bottom wall being thereby disposed in substantially the same horizontal plane whereby a water chamber the full height of said ice container is provided about the latter, a cock communicating with the lower portion of the water chamber, a loose cover closing the top of the water chamber, and a secured closure for the open lower end of said ice container and co-operating with said bottom wall to close said ice container.

4. A water cooler comprising an outer shell open at its top, an apertured bottom wall therefor, an ice container shell closed at its top and positioned with its lower edge around the aperture in said bottom wall, the lower open edge of said ice container and the bottom wall being disposed in substantially the same horizontal plane whereby a water chamber the full height of said ice container is provided outside the latter, a cock communicating with the lower portion of the water chamber, a loose cover closing the top of the water chamber, and a secured closure for the lower open end of said ice container and cooperating with said bottom wall to close the same.

Signed at Chicago, county of Cook and State of Illinois, this 9th day of May, 1921.

GEORGE F. DENNE.

Witnesses:
W. J. WANTUCH,
WM. KIRSCH.